(12) United States Patent
Miyazaki et al.

(10) Patent No.: US 8,005,003 B2
(45) Date of Patent: Aug. 23, 2011

(54) METHOD, APPARATUS AND INTEGRATED CIRCUIT FOR CONTROLLING TRANSMISSION RATE

(75) Inventors: Tomiya Miyazaki, Fukuoka (JP); Toru Yasukawa, Fukuoka (JP)

(73) Assignee: Panasonic Corporation, Osaka (JP)

( * ) Notice: Subject to any disclaimer, the term of this patent is extended or adjusted under 35 U.S.C. 154(b) by 172 days.

(21) Appl. No.: 12/065,864

(22) PCT Filed: Sep. 7, 2006

(86) PCT No.: PCT/JP2006/318205
§ 371 (c)(1),
(2), (4) Date: Mar. 5, 2008

(87) PCT Pub. No.: WO2007/029870
PCT Pub. Date: Mar. 15, 2007

(65) Prior Publication Data
US 2009/0268752 A1    Oct. 29, 2009

(30) Foreign Application Priority Data

Sep. 7, 2005  (JP) ................................. 2005-259295

(51) Int. Cl.
*H04J 3/14* (2006.01)
(52) U.S. Cl. ...................................... 370/252; 370/442
(58) Field of Classification Search .................. 370/458, 370/437, 420, 445
See application file for complete search history.

(56) References Cited

U.S. PATENT DOCUMENTS

| 6,885,674 | B2 * | 4/2005 | Hunt et al. ..................... 370/420 |
| 7,460,553 | B2 * | 12/2008 | Riveiro Insua et al. ....... 370/437 |
| 7,623,542 | B2 * | 11/2009 | Yonge et al. .................. 370/445 |
| 7,636,370 | B2 * | 12/2009 | Yonge et al. .................. 370/445 |
| 2004/0136393 | A1 | 7/2004 | Riveiro Insua et al. |
| 2005/0030967 | A1 | 2/2005 | Ohmi et al. |
| 2008/0219176 | A1 | 9/2008 | Yamada |

FOREIGN PATENT DOCUMENTS

| EP | 1 388 954 | 2/2004 |
| JP | 2000-165304 | 6/2000 |
| JP | 2002-246963 | 8/2002 |
| JP | 2005-184662 | 7/2005 |
| JP | 2005-236416 | 9/2005 |
| JP | 2007-529157 | 10/2007 |
| WO | 03/100996 | 12/2003 |

OTHER PUBLICATIONS

International Search Report dated Jan. 18, 2007.

* cited by examiner

*Primary Examiner* — Ricky Ngo
*Assistant Examiner* — Ben H Liu
(74) *Attorney, Agent, or Firm* — Dickinson Wright PLLC

(57) ABSTRACT

A plurality of PLC adapters, such as a master 21 and slaves 22, are connected to a power line 11, which forms a PLC logic network 16. Electric apparatuses 48, such as a television monitor and a video recorder, are connected to the master 21 and the slaves 22 through repeaters 31. The master 21 is a control terminal having the function of QoS controller. The master 21 allocates timeslots for transmitting data over a network, acquires information on the actual data transmission rate detected by a data receiving terminal, and modifies the timeslot allocated to target data on the basis of the acquired information on the actual data transmission rate.

21 Claims, 12 Drawing Sheets

METHOD, APPARATUS AND INTEGRATED CIRCUIT FOR CONTROLLING TRANSMISSION RATE

TECHNICAL FIELD

The present invention relates to a method and apparatus for controlling a transmission rate and an integrated circuit for controlling a transmission rate that are used in power line communication transmitting stream data such as moving pictures or voices.

BACKGROUND ART

For instance, there has been proposed a system that facilitates communication among a plurality of apparatuses by connecting information apparatuses, such as personal computers, and electric apparatuses, such as television monitors, recorders, video players, and Internet Protocol (IP) telephones, with one another in buildings over a predetermined communication network. However, when data communication is performed through wired communication in buildings, cables or connectors used as transmission paths need to be typically installed at necessary positions. Therefore, a complicated construction work may be needed to construct communication systems.

Since commercial electric power sources, e.g., AC 120V (60 Hz) or 100V (50/60 Hz), are used in most houses, power lines used for supplying power are installed in the houses beforehand. Accordingly, when the power lines can be utilized as transmission paths for data communication, it is not necessary to newly provide communication lines and it is possible to secure the communication lines by connecting the communication apparatuses to outlets connected to the power source.

A power line communication (PLC) technology using the power lines for telecommunication has been disclosed in JP-A-2000-165304. In addition, various technology groups have been researching and developing the PLC technologies in predetermined frequency bands (for example, United States: 1.7 to 80 MHz, Japan: 2 to 30 MHz). In more detail, there has been proposed a method of using a plurality of subcarrier waves to generate multicarrier signals like an OFDM (orthogonal frequency division multiplexing) mode, and transmitting the multicarrier signals through the power lines.

However, due to the complicated wiring of power lines within buildings and different conditions of the buildings, the power lines have different transmission path capabilities according to locations. In addition, since various kinds of electric apparatuses are connected to the power lines, various kinds of noises may occur, and impedance is easy to vary. Thus, communication over the power lines is less likely to acquire a desired communication rate or more likely to have a poor communication quality due to a reduced S/N (signal-to-noise) ratio, as compared to communication over dedicated wired transmission paths.

Accordingly, in the power line communication, transmission path estimation is carried out on transmission paths between a transmission terminal and a receiving terminal at a predetermined timing before or during communication to measure transmission path characteristics, such as S/N, and transmission parameters are set so as to acquire a maximum transmission rate (bit rate) within an available range. At this time, a modulation factor (the degree of data overlap) on each carrier of a multicarrier signal is determined as the transmission parameter. When the transmission path has a favorable condition, the modulation factor is raised to increase the data transmission amount per unit time (to increase the bit rate). When the transmission path has a poor condition, the modulation factor is lowered to reduce the data transmission amount per unit time (to reduce the bit rate). Accordingly, it is possible to reduce an error rate to a predetermined value or less at the time of communication.

Meanwhile, when various electric apparatuses in houses are connected to one another through a network to transmit stream data, such as moving pictures or voices, it is necessary to secure QoS (quality of service) so that the data cannot be interrupted. In order to secure QoS in the power line communication, transmission band assurance needs to be performed, for example, by using a TDMA (time division multiple access) mode to allocate predetermined invariable timeslots on the basis of the maximum transmission rate for the transmission of stream data.

However, when the band assurance is performed by allocating the invariable time width of a timeslot on the basis of the maximum transmission rate of data in order to secure QoS with respect to specific data such as stream data, an unnecessarily large time width of timeslot may be secured at the timing when a great amount of data is not actually transmitted. Accordingly, since an available timeslot is limited in the transmission path, the timeslot may be insufficient, and thus the data may not be fully transmitted. In addition, the condition of the transmission path may vary in the power line communication with time. Accordingly, when an invariable time width of timeslot for the maximum transmission rate is secured to transmit data requiring QoS, other data may not be completely transmitted, if the transmission path is in a poor condition.

As described above, in a case in which data requiring QoS, such as stream data, is transmitted, when the band assurance is performed by allocating the invariable time width of timeslot on the basis of the maximum transmission rate of data in order to secure QoS with respect to specific data such as stream data, other data may not be fully transmitted due to an insufficient timeslot.

DISCLOSURE OF INVENTION

It is an object of the present invention to provide a transmission rate control method, a transmission rate control apparatus, and an integrated circuit that can secure an appropriate time width of timeslot according to an actual data transmission rate and efficiently utilize a timeslot in a limited transmission path when data requiring QoS, such as stream data, is transmitted.

According to an aspect of the invention, there is provided a transmission rate controller that controls a transmission rate of data transmitted through a power line. The transmission rate controller includes: a timeslot allocation unit that allocates timeslots; a transmission rate information acquisition unit that acquires transmission rate information indicating the transmission rate of data transmitted in the timeslot allocated by the timeslot allocation unit; and a timeslot modification unit that modifies the timeslot allocated by the timeslot allocation unit on the basis of the transmission rate information acquired by the transmission rate information acquisition unit.

According to this aspect, when data requiring QoS, such as stream data, is transmitted, it is possible to secure an appropriate timeslot according to the transmission rate of data by modifying the timeslot allocated to the transmitted data on the basis of information related to the transmission rate. Thus, it is possible to efficiently utilize the timeslot in a limited transmission path, for example, by using an unused part of the timeslot to transmit other data.

According to another aspect of the invention, there is provided a method of controlling a transmission rate. The method includes: controlling the transmission rate of data transmitted through a power line; allocating a timeslot for transmitting the data; acquiring transmission rate information indicating the transmission rate of data transmitted in the timeslot; and modifying the timeslot on the basis of the transmission rate information.

According to this aspect, when data requiring QoS, such as stream data, is transmitted, it is possible to secure an appropriate timeslot according to the transmission rate of data by modifying the timeslot allocated to the transmitted data on the basis of information related to the transmission rate. Thus, it is possible to efficiently utilize the timeslot in a limited transmission path, for example, by using an unused part of the timeslot to transmit other data.

According to still another aspect of the invention, there is provided an integrated circuit for controlling a transmission rate of data transmitted through a power line. The integrated circuit includes: a timeslot allocation unit that allocates timeslots; a transmission rate information acquisition unit that acquires transmission rate information indicating the transmission rate of data transmitted in the timeslot allocated by the timeslot allocation unit; and a timeslot modification unit that modifies the timeslot allocated by the timeslot allocation unit on the basis of the transmission rate information acquired by the transmission rate information acquisition unit.

According to this aspect, when data requiring QoS, such as stream data, is transmitted, it is possible to secure an appropriate timeslot according to the transmission rate of data by modifying the timeslot allocated to the transmitted data on the basis of information related to the transmission rate. Thus, it is possible to efficiently utilize the timeslot in a limited transmission path, for example, by using an unused part of the timeslot to transmit other data.

The present invention provides a transmission rate control method, a transmission rate control apparatus, and an integrated circuit that can secure an appropriate time width of timeslot according to an actual data transmission rate and efficiently utilize a timeslot in a limited transmission path when data requiring QoS, such as stream data, is transmitted.

BEST MODE FOR CARRYING OUT THE INVENTION

An embodiment of the present invention describes a case in which stream data, such as moving pictures or voices, is transmitted over a power line communication (PLC) network using power lines that are provided at home as transmission paths.

In the present embodiment, the term 'timeslot' means a time channel having a continuous time width and is capable of being used for data transmission between communication apparatuses. Even though the following embodiment describes timeslots used in a time division multiple access mode, the timeslots may be used in other multiple access modes. Examples of other multiple access modes include CSMA/CA (carrier sense multiple access with collision avoidance) and CSMA/CD (carrier sense multiple access with collision detection). In addition, even though the following embodiment describes a case in which allocated timeslots are modified on the basis of transmission rates, allocated frequency channels may be modified on the basis of transmission rates.

Figure 1:
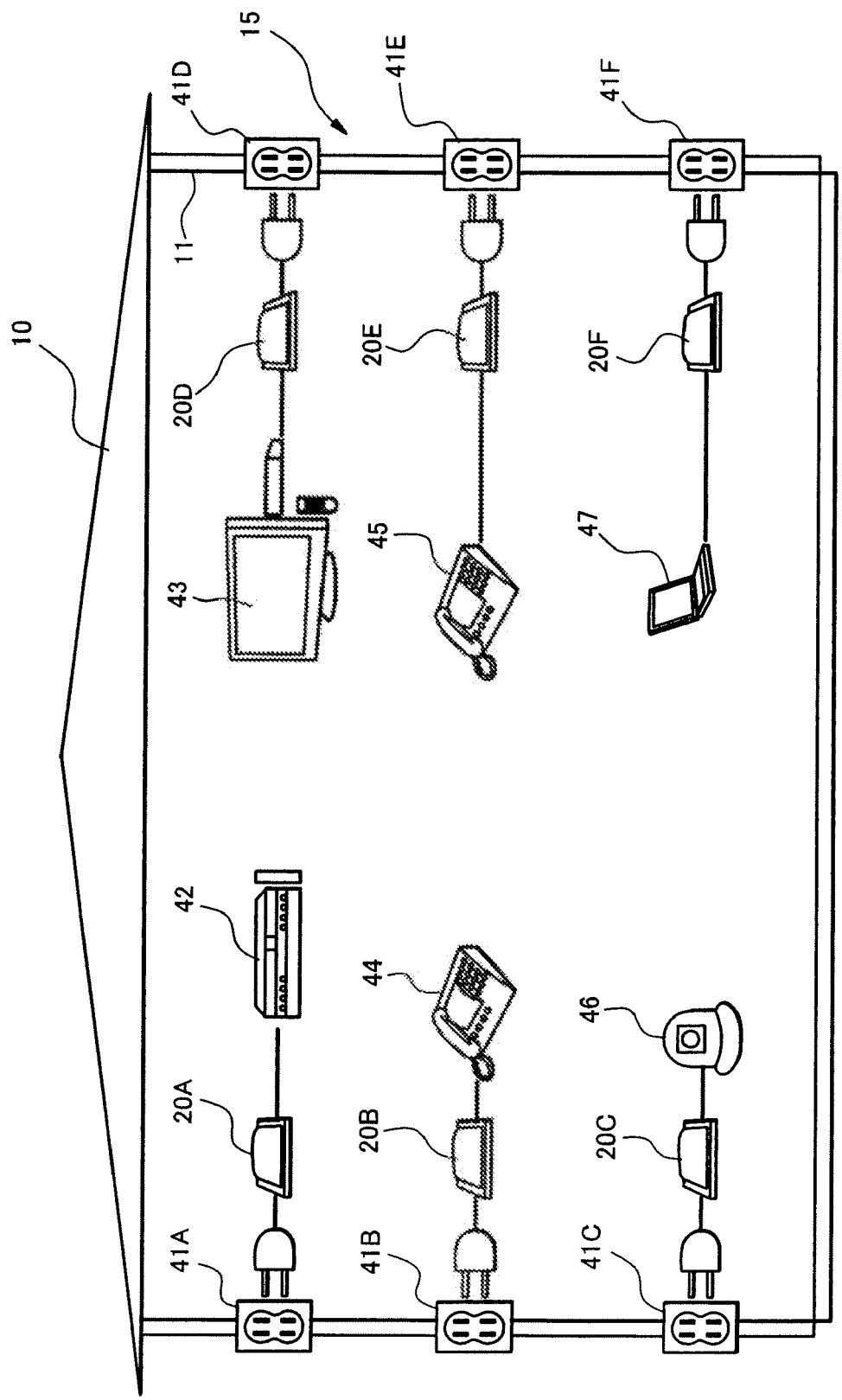
FIG. 1 is a diagram illustrating a communication system including a transmission rate controller according to an embodiment of the present invention.

As shown in FIG. 1, a power line 11 used to supply commercial electric power is arranged, and AC outlets 41A to 41F connected to the power line 11 are provided in a house 10. A plurality of terminals are connected to the AC outlets 41A to 41F. In this case, PLC adapters 20A to 20F equipped with a power line communication function are connected to the AC outlets 41A to 41F, respectively. A hard disk drive (HDD) recorder 42 recording and playing moving pictures is connected to the PLC adapter 20A. An Internet Protocol (IP) telephone 44 for IP telephony through Voice over Internet Protocol (VoIP) is connected to the PLC adapter 20B. An IP camera 46 transmitting photos over the IP network is connected to the PLC adapter 20C. A television set 43, such as a high-definition plasma television, is connected to the PLC adapter 20D. An IP telephone 45 is connected to the PLC adapter 20E. A personal computer (PC) 47 is connected to the PLC adapter 20F.

The PLC adapter 20A and the HDD recorder 42, the PLC adapter 20B and the IP telephone 44, the PLC adapter 20C and the IP camera 46, the PLC adapter 20D and the television set 43, the PLC adapter 20E and the IP telephone 45, and the PLC adapter 20F and the PC 47 are connected to each other through communication interfaces such as Ethernet (registered trademark) or USB (universal serial bus). The above-mentioned elements constitute a PLC network 15, which serves as a local telecommunication network, transmitting data through the power line 11 used as a common transmission path.

Referring to FIG. 1, when high-definition images played by the HDD recorder 42 are transmitted and displayed on the television set 43, stream data of the images is transmitted through a path composed of the PLC adapter 20A, the AC outlet 41A, the power line 11, the AC outlet 41D, and the PLC adapter 20D. In addition, when voice communication over VoIP is carried out between the IP telephone 44 and the IP telephone 45, stream data of voices is transmitted through a path composed of the PLC adapter 20B, the AC outlet 41B, the power line 11, the AC outlet 41E, and the PLC adapter 20E. When images captured by the IP camera 46 are monitored with the PC 47, data of the captured images is transmitted through a path composed of the PLC adapter 20C, the AC outlet 41C, the power line 11, the AC outlet 41F, and the PLC adapter 20F. The images captured by the IP camera 46 may be transmitted as stream data with high resolution and at a high-frame rate. They may be transmitted as typical IP packet data when they have low resolution.

A plurality of terminals communicating with each other over the PLC network 15 are divided into main and slaves, and communication control is carried out under the control of the master. In FIG. 1, one of the PLC adapters 20A to 20F acts as the master, and the others serve as the slaves. In case of where the network includes a plurality of terminals, a terminal, which controls communication operations of the other terminal, is referred as a master; and a terminal, communication operation of which is controlled by the master, is defined as slave. The master performs communication control on the network. For instance, the master serves as a QoS (quality of service) controller for controlling QoS of the PLC network 15 to act as a transmission rate controller. The master transmits a beacon used to adjust communication timing, together with control information, to the PLC network 15 at regular intervals, and makes a transmission band reservation for allocating the time width of timeslot to a communication link established between terminals in one period between beacons to control QoS of the PLC network 15. In FIG. 1, upon transmitting stream data, e.g., upon transmitting high-definition moving pictures (HD video streaming) from the HDD recorder 42 to the television set 43, or upon transmitting voice data over VoIP between the IP telephone 44 and the IP telephone 45, it is necessary to secure predetermined QoS on the basis of data transmission rates so that the data can be transmitted to recipients without interruption.

Transmission bands required to secure QoS of data according to the type of data (content) to be transmitted are assigned. For instance, a transmission band of a maximum of 24 Mbps is assigned for transmission of high-vision images, a transmission band of a maximum of 6 Mbps is assigned for transmission of television image signals, a transmission band of 64 Kbps×2 (=128 Kbps) is assigned for transmission of conversation signals of IP telephone over VoIP, and 384 Kbps+706 Kbps×7 (=5.20 Mbps) is assigned for transmission of audio content such as musical pieces. As described above, the transmission bands are different from one another in terms of the time width of timeslot required according to the type of data transmitted.

Figure 2:
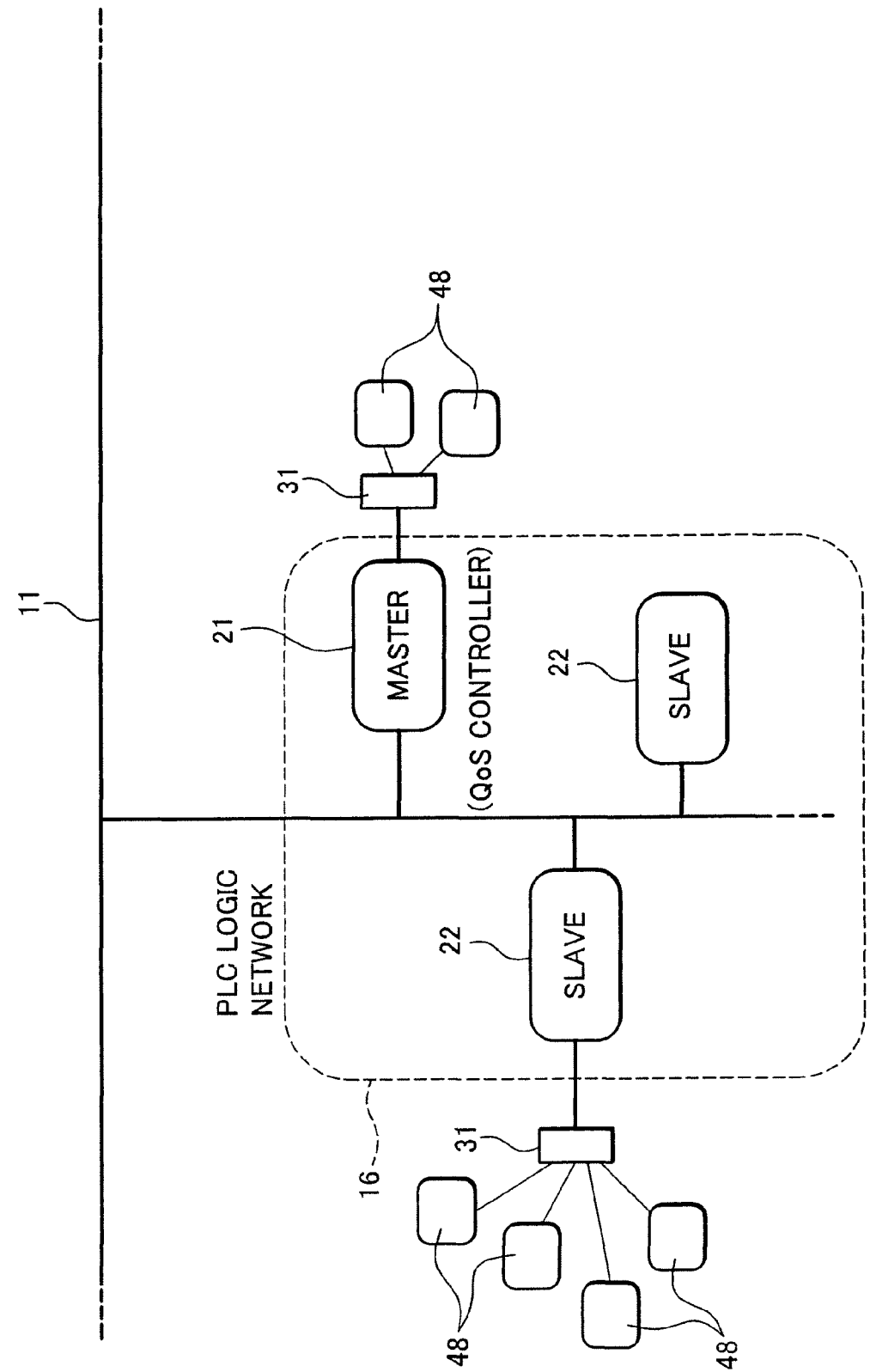
FIG. 2 is a block diagram schematically illustrating the configuration of a PLC network including a transmission rate controller according to an embodiment of the present invention.

As shown in FIG. 2, a plurality of PLC adapters 21 and 22 are connected to the power line 11, and a master 21 and slaves 22 are provided. The master 21 and the slaves 22 constitute a PLC logic network 16. The master 21 serves as a transmission rate controller in the PLC logic network 16 (within a frame marked with a dotted line). Although not shown in FIG. 2, a plurality of PLC logic networks may be provided by a plurality of terminals connected to a common power line.

The master 21 and the slaves 22 are connected to repeaters 31, such as an Ethernet hub, and electric apparatuses 48, such as a television monitor, a video recorder, a telephone, and a personal computer, are connected through the repeaters 31. Data transmission between the master 21 and the slave 22 or between the slaves 22 is carried out through power line communication. Data transmission among the main and slaves 21 and 22, the repeater 31, and the electric apparatus 48 is carried out through communication interface such as Ethernet.

The master 21 is a transmission rate controller, serving as a QoS controller, and only a single master 21 is provided within the PLC logic network 16. The master 21 performs operations of (1) managing terminal information within the network, (2) receiving and scheduling a transmission band reservation, and (3) transmitting beacons at regular intervals and notifying schedules to the terminals. The slave 22 performs communication according to the schedules written on the beacons transmitted over the network. That is, the PLC network carries out communication control under the control of the master 21 so that communications can be made between the master 21 and slave 22, or between the slaves 22.

Figure 3:
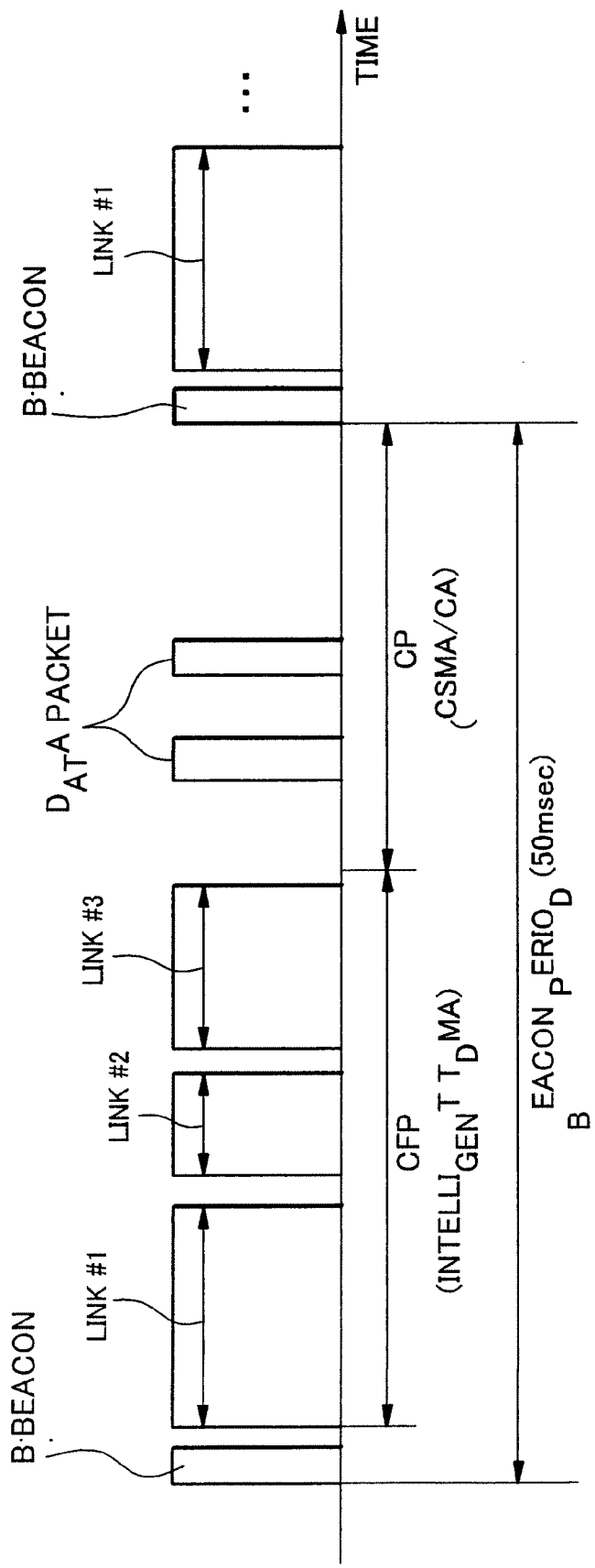
FIG. 3 is a time chart illustrating an operation of allocating the time width of a timeslot on a PLC network according to an embodiment of the present invention.

As shown in FIG. 3, beacons B are transmitted from the master 21 at regular intervals (for example, 50 msec) on the PLC network, and data is transferred between the terminals in one period of the beacon B (hereinafter referred to as a beacon period) according to the scheduling of the master 21. In this case, the master 21, serving as a QoS controller, allocates the time width of required timeslot to a communication link for data transmission requiring QoS of stream data among communication links established between the terminals. In the present embodiment, as described below, the timeslots are modified on the basis of a maximum transmission rate required for data to be transmitted and an actual data transmission rate.

The beacon period is divided into a contention-free period CFP assigned in a front segment according to a TDMA (time division multiple access) mode, and a contention period CP assigned in a rear segment according to a CSMA/CA mode. That is, the beacon period is composed of the contention-free period CFP and the contention period CP. In the contention-free period CFP, timeslots with variable time widths are set to each communication link, and data is transmitted on each of the timeslots according to an intelligent TDMA mode. On a communication link transmitting stream data, such as moving pictures or voices requiring establishment of timeslot, a predetermined time width of timeslot is allocated according to the transmission rate of data in the contention-free period CFP so as to secure QoS. In the contention period CP, according to a communication request of each of the terminals, data is transmitted at a predetermined timing in the CSMA/CA mode. Data packets requiring no real-time transmission or consecutive transmission, e.g., PC data or control information that are not necessary to secure the timeslot are transmitted on demand in the contention period CP. With the above-mentioned data transmission method, it is possible to simultaneously transmit data requiring QoS of stream data, and data transmitted on demand such as PC data.

Referring to FIG. 3, timeslots are allocated to three communication links #1, #2 and #3. For instance, the communication link #1 corresponds to a link used to transmit moving picture data between the HDD recorder 42 and the television set 43, and the communication link #2 corresponds to a link used to transmit voice data between the IP telephone 44 and the IP telephone 45. In this case, as the time width of timeslot becomes larger, the transmission band becomes wider.

The master 21 transmits the beacon B containing information related to the schedule of the timeslot of each of the communication links allocated during the contention-free period CFP. Accordingly, each of the terminals (the main and slaves 21 and 22) on the PLC network can know the timeslot that is available on a communication link with another terminal communicating with itself from the timing of the beacon B and information contained in the beacon B, and uses the timeslot allocated to itself to perform data communication.

The size of the actual transmission band available varies on the basis of the time width of the timeslot and the maximum bit rate defined by a modulation mode used by each of the communication links during the actual communication.

Figure 4:
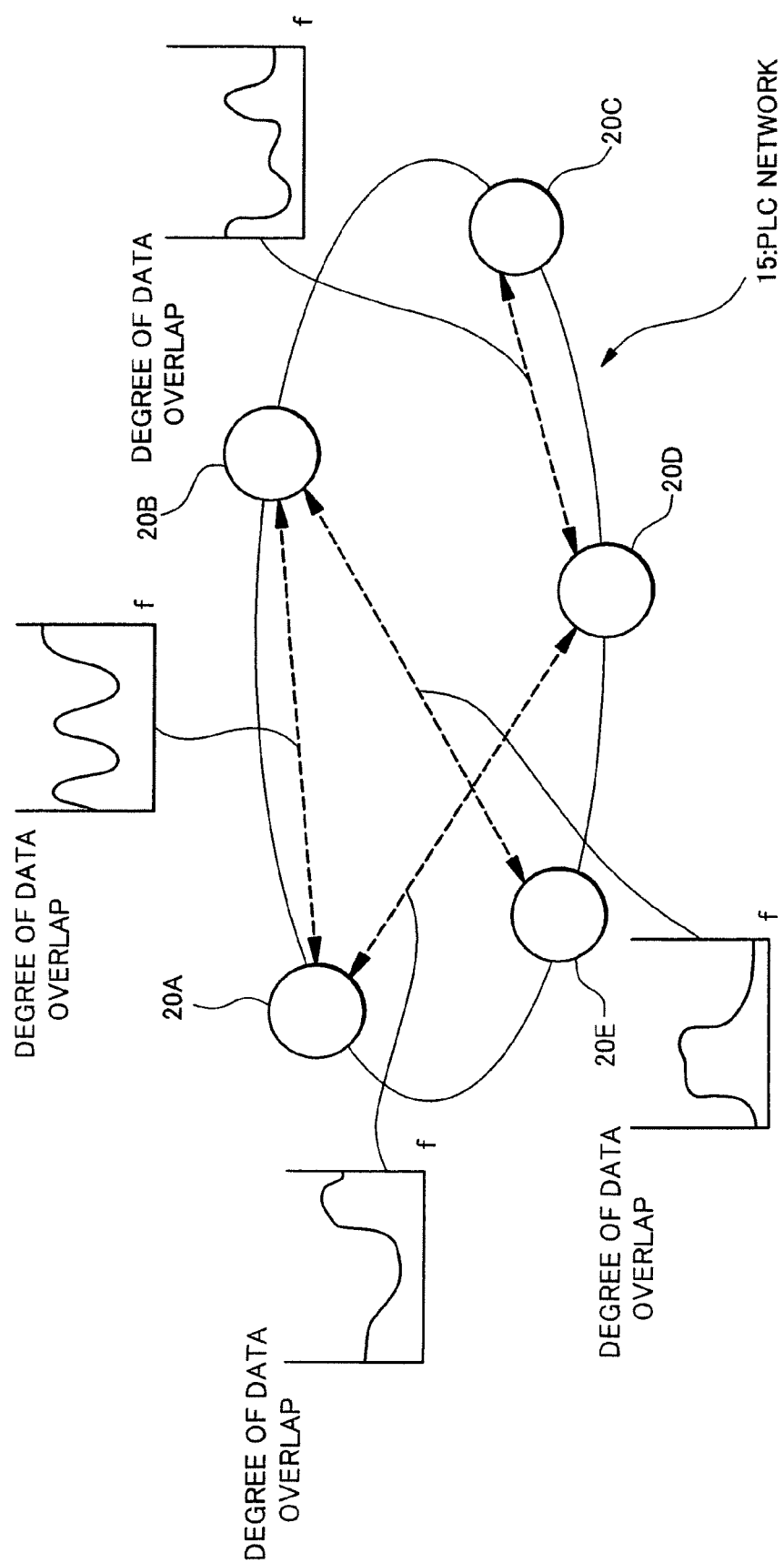
FIG. 4 is a diagram illustrating the degree of data overlap on a PLC network according to an embodiment of the present invention.

Since transmission paths between the PLC adapters 20A to 20E on the PLC network 15 are different from one another, the transmission paths have different transmission parameters (for example, modulation patterns indicating modulation modes). Referring to FIG. 4, modulation factors (corresponding to the degree of data overlap) with respect to the sub carrier frequencies of multi-carrier signals on the frequency axis are shown with respect to the respective transmission paths. The transmission parameter determines communication capability per unit time, i.e., maximum bit rate.

In the PLC network 15, transmission paths, such as S/N, are estimated at a predetermined timing before or during communications to measure the state of the transmission paths (characteristics of the transmission paths), and transmission parameters are set to acquire the maximum transmission rate (bit rate) within an available range. For instance, in a favorable environment in which S/N is high due to a low noise in a transmission path, a modulation mode with a high modulation factor, such as '256 QAM' or '16 QAM', is employed. In a poor environment in which S/N is low due to a high noise in a transmission path, a modulation mode with a low modulation factor, such as '4 QAM' or '2 QAM', is employed. Based on the condition of detected noises, among a plurality of sub-carriers that are previously prepared, some of the sub-carriers that are used in the actual communication, the other sub-carriers that are not used in the actual communication are determined. As a result, different transmission parameters are set with respect to the transmission paths between the terminals.

The master having the function of the QoS controller modifies the time width of the timeslot allocated to communication links between the terminals within the maximum bit rate that is set with respect to the transmission path of each of the terminals.

Figure 5:
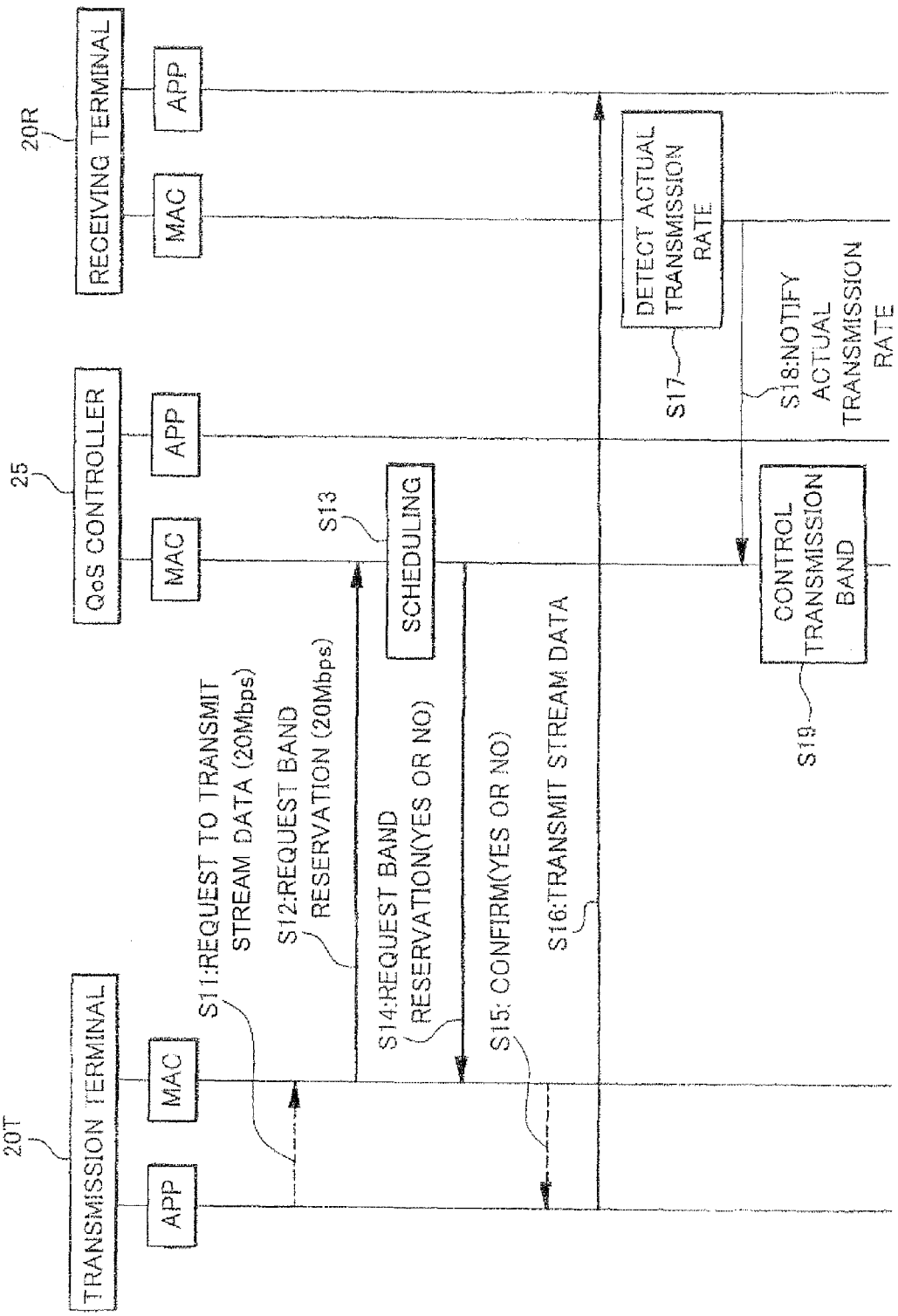
FIG. 5 is a sequence diagram illustrating an operation of allocating the time width of a timeslot in a transmission rate controller according to an embodiment of the present invention.

An operation of allocating the time width of a timeslot will be described with reference to FIG. 5 using the QoS controller 25, serving as a transmission rate controller corresponding to the master 21, and a data transmission terminal 20T and a data receiving terminal 20R among the slaves 22. The QoS controller 25 serves as a transmission rate controller, and functions as a timeslot allocation unit, a transmission rate information acquisition unit, and a timeslot modification unit. More specifically, a MAC (media access control layer) block 131A of a PLC integrated circuit (PLC LSI) 131 functions as a timeslot allocation unit, a transmission rate information acquisition unit, and a timeslot modification unit.

When an application program of the transmission terminal 20T starts to transmit stream data, a request for transmission of stream data is transmitted from an upper-layer application (APP) to a lower-layer media access control (MAC) (S11). In this case, stream data is transmitted at a maximum transmission rate of 20 Mbps. Since the stream data, such as moving picture or voices, needs to be transmitted in real time or consecutively, it is necessary to secure a timeslot required to transmit data at a transmission rate appropriate for the data in a transmission path so that the data cannot be interrupted during transmission. Thus, the transmission terminal 20T makes a band reservation request to secure a required timeslot according to the type of stream data to be transmitted in the lower-layer MAC (S12). The band reservation request is transmitted to the lower-layer MAC of the QoS controller 25.

When the QoS controller 25 receives the band reservation request from the transmission terminal 20T, it carries out scheduling of corresponding communication links according to the time length of the required timeslot (S13). At this time, as shown in FIG. 3, timeslots are allocated to the communication links. Since it is not certain whether the time width of the required timeslot will be secured, the transmission terminal 20T is notified whether the band has been secured as a response to the band reservation (S14).

When the QoS controller 25 attempts to secure the band, it needs to know the maximum bit rate of each transmission path, as described above. Thus, communication is performed between the transmission terminal 20T and the receiving terminal 20R beforehand to make an estimation of a transmission path. As a result, information related to the maximum bit rate determined on the basis of the transmission path estimation is transmitted from the receiving terminal 20R to the QoS controller 25.

In the transmission terminal 20T, when the lower-layer MAC receives the band reservation response, the lower-layer MAC notifies the upper-layer APP whether the band has been secured or not (S15). When the band has been secured, stream data is transmitted from the transmission terminal 20T to the receiving terminal 20R (S16). The above-mentioned processes make it possible to assign transmission bands required for individual communication links beforehand.

However, when the stream data is actually transmitted, the amount of data transmitted per unit time is not constant. In addition, it is rare that all the timeslots secured according to the maximum transmission rate by the type of stream data are used all the time. At certain timing, only a part of the time width of the allocated timeslot is actually used, and the other parts of the time width of the time slot are not used. Thus, in the present embodiment, an actual data transmission rate is detected to modify the time width of the timeslot allocated according to a data transmission rate.

The receiving terminal 20R detects the transmission rate of actual data (hereinafter, referred to as transmission rate) with respect to stream data transmitted through a communication link with the transmission terminal 20T (S17). At this time, the amount of data received during a predetermined period of time is detected. Transmission rate information indicating the detected transmission rate is notified to the QoS controller 25 (S18).

Since the receiving terminal detects the transmission rate, the QoS controller 25 can acquire the transmission rate information indicating the actual transmission rate. Thus, when an unstable transmission path, such as a power line, is used, it is possible to reflect the condition of a transmission rate at that time regardless of a change in the condition of a transmission path (that is, a change in the characteristics of a transmission path).

In addition, it is not necessary for the receiving terminal to notify the transmission rate. For example, instead of the receiving terminal 20R, a terminal (for example, another PLC adapter that is connected to the same outlet as the PLC adapter serving as the receiving terminal 20R) provided adjacent to the receiving terminal 20R may detect and notify the transmission rate to the QoS controller 25 in the transmission path between the transmission terminal 20T and the receiving terminal 20R. In this case, since packets need to be transmitted to the receiving terminal 20R, the receiving terminal 20R preferably transmits transmission parameters, such as a modulation pattern indicating a modulation mode, to the terminal beforehand.

The QoS controller 25 acquires the data transmission rate information from the receiving terminal 20R, and modifies the time width of a timeslot on the basis of the transmission rate information (S19). At this time, an actual transmission rate and a transmission rate that can be transmitted within the time width of the timeslot allocated to a communication link of the corresponding stream data are compared with each other. When the time width of the timeslot is excessively larger than a predetermined data transmission rate, the time width of the timeslot is modified to have a smaller value, and an unused timeslot is opened.

The transmission rate that can be transmitted in the allocated timeslot may be read from a table of transmission rates corresponding to timeslots stored in the QoS controller 25 beforehand. Alternatively, on the basis of a predetermined expression representing the relationship between the time width of a timeslot and the transmission rate, the transmission rate may be calculated from the time width of the allocated timeslot.

After the time width of the timeslot is modified, the time width of the timeslot is modified to have a larger value when the actual transmission rate becomes high and a wider time width of timeslot is needed.

When the actual transmission rate becomes zero for a predetermined time and there exists a timeslot of the communication link not used since data is not transmitted, the timeslot may be deleted to be opened. Thus, the opened timeslot can be used for other communication links, and other timeslots can be secured.

Figure 6:
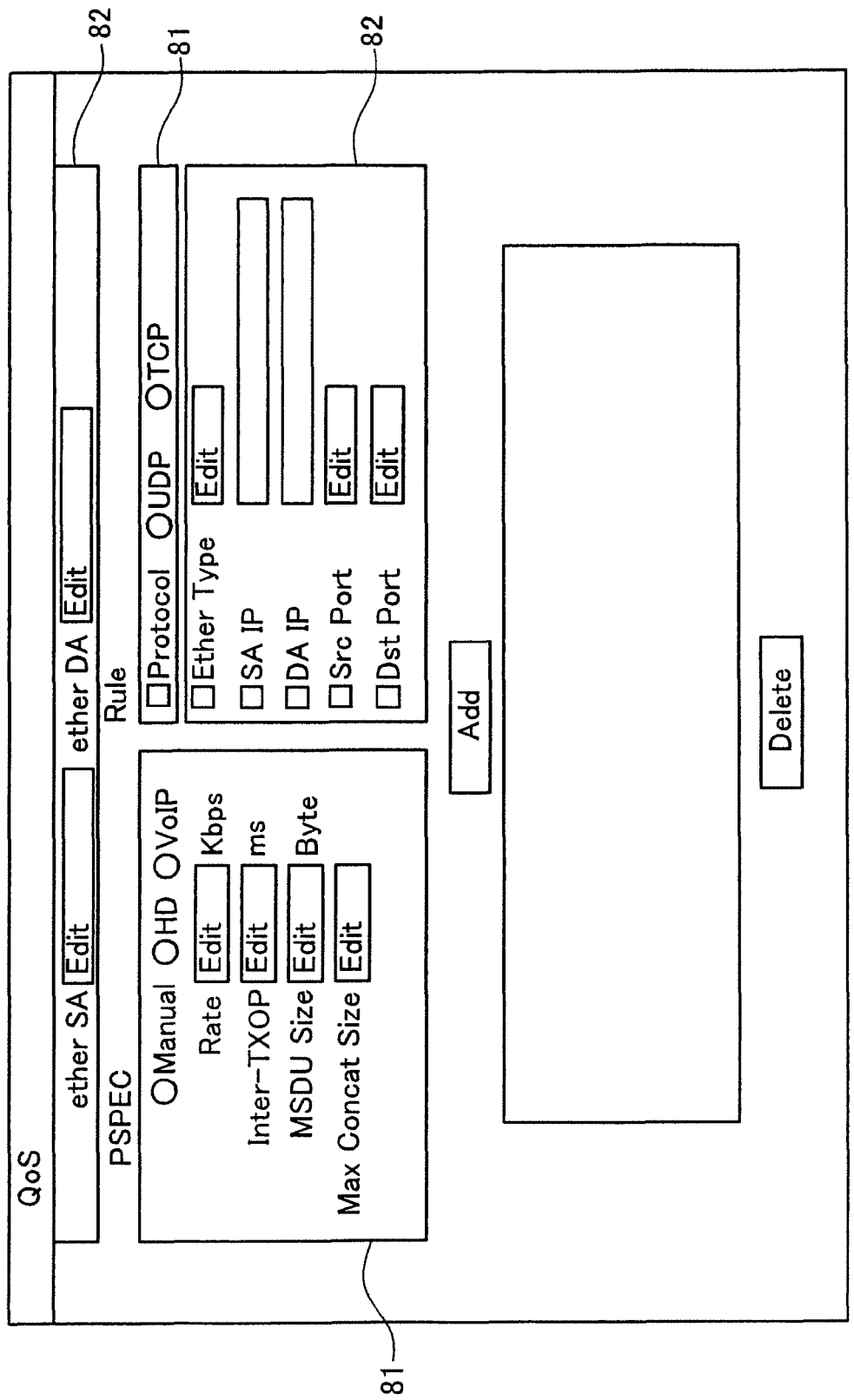
FIG. 6 is a diagram illustrating an input setup screen for a transmission band reservation according to an embodiment of the present invention.

A user inputs the type of data transmitted between the terminals in the PLC network 15 and the time width of a timeslot appropriate for the data in a PLC adapter that is the master serving as a QoS controller. At this time, an input setup screen shown in FIG. 6 is displayed on a monitor of a personal computer or a television set connected to the PLC adapter, and values or instructions are input by an operation unit such as keys.

The input setup screen for the transmission band reservation includes input items, such as a QoS parameter 81 related to values, such as a transmission rate or the delay time of data to be transmitted, and terminal information 82 related to terminals that the data is transmitted to and received from. For the QoS parameter 81, a value, such as the time width of a timeslot, may be manually input, or a predetermined value may be input by selecting the type of data, such as HD (high-definition moving picture) or VoIP (IP telephone). Thus, information related to the transmission and receiving terminals and the type of data are set, and the QoS controller allocates the time width of a timeslot on the basis of the setup information.

Figure 7:
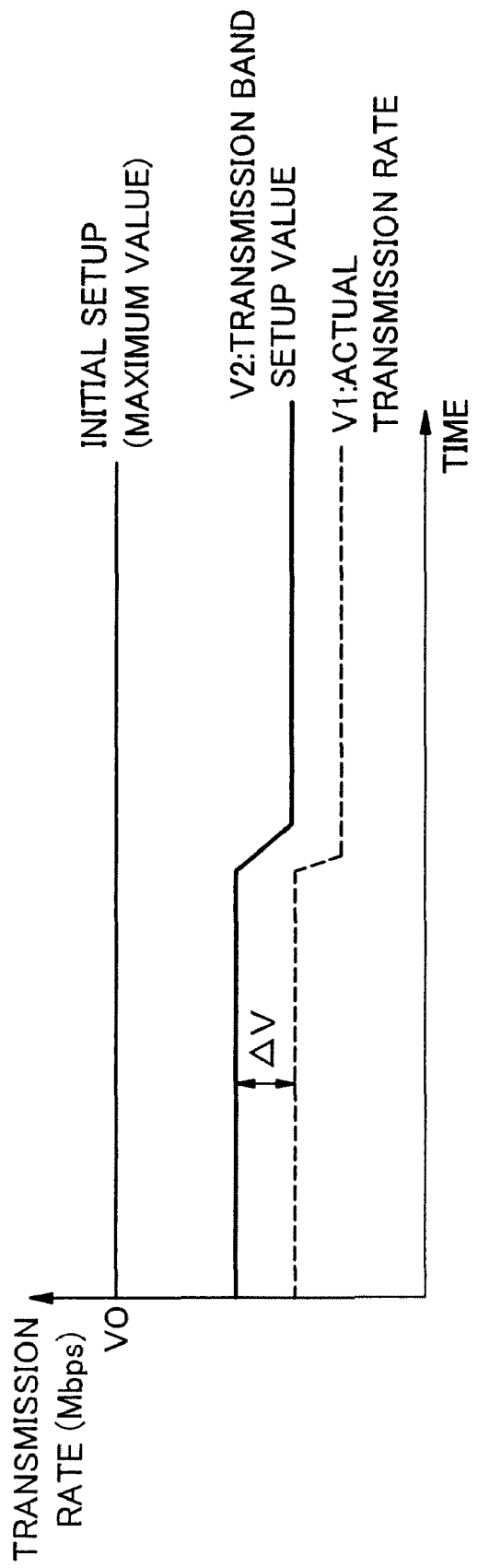
FIG. 7 is a time chart showing a first example of transmission rate control in a transmission rate controller according to an embodiment of the present invention.

The first example shown in FIG. 7 illustrates an operation of using an average actual transmission rate per predetermined time to adjust a transmission rate.

In the first example, the average value of data transmission rates (the amount of data transmitted) per predetermined time (for example, 0.5 sec) is used as an actual transmission rate V1 to control the transmission rate. It is possible to secure a data amount of 500 ms typically required for buffering high-vision images by setting the predetermined time to more than 0.5 sec. The average of the actual transmission rate is calculated by the receiving terminal 20R or the QoS controller 25. In this case, the QoS controller 25 determines a transmission rate V2 assigned to a communication link between the transmission terminal 20T and the receiving terminal 20R on the basis of the average of the actual transmission rates V1 as represented by the following expression. An initial value V0 of the transmission rate V2 is set by assigning an available maximum value on the basis of the maximum transmission rate of data transmitted.

$$V2 = V1 + \Delta V$$

$\Delta V$: margin appropriate for the value of V1.

As shown in FIG. 7, the transmission rate V2 is adjusted so as to follow the average of the actual transmission rates V1 per predetermined time with a little delay when the average of the actual transmission rates V1 is changed.

A second example illustrates an operation of monitoring the actual transmission rate to adjust a transmission rate at predetermined intervals.

In the second example, while the actual transmission rate V1 is continuously monitored, the average value, minimum value, and maximum value of the data transmission rate within a predetermined time T1 (for example, 0.5 sec) are used to control the transmission rate for every period T1. In this case, the QoS controller 25 determines the transmission rate V2 after every period V1 by the average value, minimum value, and maximum value of the actual transmission rate V1 and the value and variation of the transmission rate V1 as represented by the following expression:

$$V2 = \text{(the average value, minimum value or maximum value of } V1 \text{ in a predetermined time } T1) + \Delta V,$$

$\Delta V$: margin appropriate for the value and variation of V1.

Figure 8:
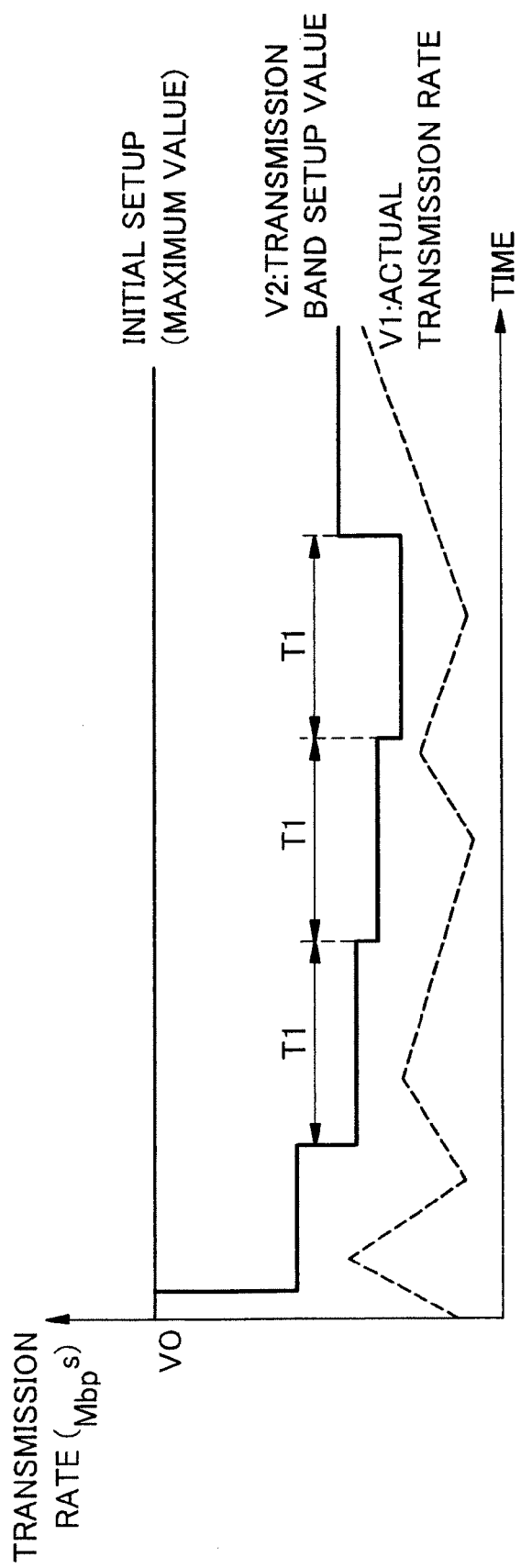
FIG. 8 is a time chart showing a second example of transmission rate control in a transmission rate controller according to an embodiment of the present invention.

Accordingly, as shown in FIG. 8, the transmission rate V2 is controlled in a step shape according to the actual transmission rate V1 for every period T1.

A third example describes an operation of controlling the transmission rate according to the actual transmission rate.

In the third example, the instantaneous value of a data transmission rate is used as the actual transmission rate V1 to constantly control the transmission rate for every short period (for example, 100 msec). In this case, the QoS controller 25 determines the transmission rate V2 according to the instantaneous value of the actual transmission rate V1 as represented by the following expression:

$$V2 = V1 + \Delta V,$$

$\Delta V$: margin appropriate for the value and variation of V1.

Figure 9:
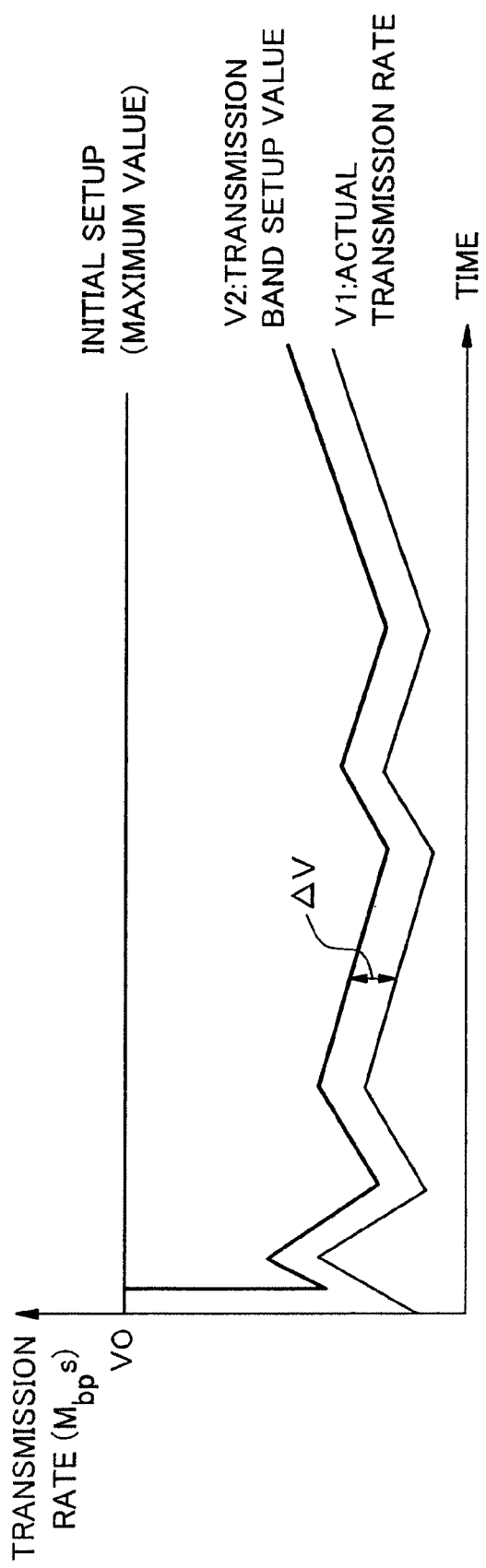
FIG. 9 is a time chart showing a third example of transmission rate control in a transmission rate controller according to an embodiment of the present invention.

Accordingly, as shown in FIG. 9, the transmission rate V2 is continuously controlled in connection with the actual transmission rate V1 at that point of time.

Thus, since the QoS controller 25 controls the transmission rate as described above, it is possible to secure an appropriate transmission rate corresponding to the actual transmission rate of stream data with respect to each communication link transmitting the stream data. In addition, since it is possible to reduce to a minimum the transmission rate assigned according to a change in the information amount per unit time of data actually transmitted, it is possible to efficiently utilize a limited timeslot on a transmission path. For example, when the information amount of data actually transmitted is small and a part of the secured timeslot is thus not used, it is possible to use the remaining part of the timeslot for another communication link by lowering the transmission rate.

In the communication system according to this embodiment shown in FIG. 1, one of the PLC adapters 20A to 20F is set as a master operating as a QoS controller, which allocates and modifies the time width of a timeslot of a communication link between terminals. In this case, according to the type of data transmitted through each communication link, the time width of the timeslot is initially allocated on the basis of the maximum transmission rate of data, and is then modified on the basis the actual data transmission rate. Thus, it is possible to secure a minimum timeslot appropriate for an actual transmission environment, and to efficiently use the timeslot over the entire network.

In such a transmission environment as a power line, transmission path characteristics may be greatly changed by connecting the power line to an electric apparatus with low impedance (for example, an electric charger), or by operating an inverter connected to the power line. However, in the present embodiment, even though the transmission path characteristics are changed, the time width of a timeslot is modified according to the actual transmission rate. Therefore, the present embodiment is suitable for a communication mode using an unstable transmission path, such as a power line, i.e., power line communication.

Figure 10:
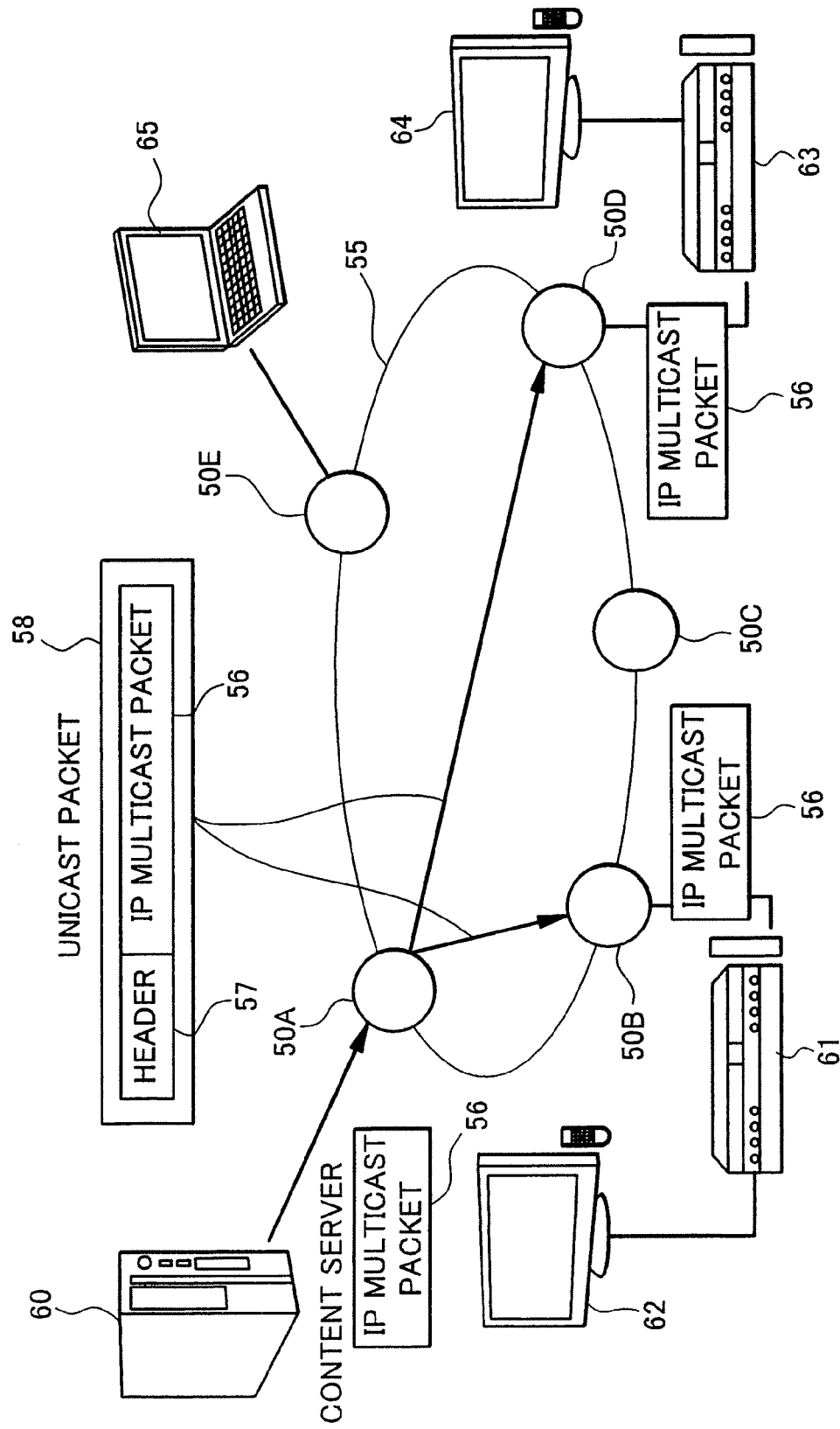
FIG. 10 is a diagram illustrating the configuration of another communication system including a transmission rate controller according to an embodiment of the present invention.

FIG. 10 is a diagram illustrating the configuration of a network for multicast data transmission.

A plurality of PLC adapters 50A to 50E are connected to a PLC network 55. The PLC adapter 50A is connected to a content server 60 for distributing content. The content server 60 stores content, such as moving pictures or voices, and distributes the content as multicast stream data to other terminals. The PLC adapter 50B is connected to a set-top box (STB) 61 for receiving, relaying, and recording image signals and a television set 62. The PLC adapter 50D is connected to an STB 63 and a television set 64. The PLC adapter 50E is connected to a personal computer 65.

The PLC adapter 50A and the content server 60, the PLC adapter 50B and the STB 61, the PLC adapter 50D and the STB 63, and the PLC adapter 50E and the personal computer 65 are respectively connected to each other via communication interfaces such as Ethernet or USB.

The PLC adapter 50A connected to the content server 60 is set as a master serving as a QoS controller, and the other PLC adapters 50B to 50E are set as slaves. The STB 61 and the STB 63 belong to a multicast group that receives multicast data from the content server 60. The personal computer 65 belongs to a non-multicast group that does not receive the multicast data.

In the present configuration, when data is distributed through multicast communication, the content server 60, which serves as an origination terminal, transmits stream data as IP multicast packets 56 to the STB 61 and STB 63, which serve as destination terminals. The IP multicast packets, if necessary, are copied in routers, hubs, or other terminals provided at branches on the network, and are transmitted to a plurality of destination terminals. Thus, when the origination terminal transmits data once, the data is received by a plurality of destination terminals.

Since individual transmission paths have different conditions on the PLC network 55, different transmission parameters are set to the transmission paths to perform communication. Thus, it is preferable to individually transmit data only on necessary transmission paths, considering data transmission efficiency. Accordingly, the multicast-to-unicast conversion of data packet is carried out in the PLC adapter 50A provided on a transmission side, and data transmission is performed in the unicast communication mode on each transmission path within the PLC network 55. Unicast-to-multicast conversion is carried out in the PLC adapters 50B and 50D, which is provided on receiver sides, to return the packet to IP multicast packets 56.

When the PLC adapter 50A receives the IP multicast packets 56 from the content server 60, it performs encapsulation (unicast encapsulation) by adding headers 57 containing destination information to the IP multicast packets 56 at individual destinations to generate unicast packets 58, thereby performing multicast-to-unicast conversion. The PLC adapters 50B and 50D perform unicast-to-multicast conversion by restoring the original IP multicast packets 56 from the unicast packets 58 encapsulated and transmitted. Stream data of the IP multicast packets 56 is transmitted to the STBs 61 and 63.

Since the stream data distributed from the content server 60 needs to secure QoS, a QoS controller provided in the PLC adapter 50A allocates and modifies the time width of a timeslot in the same manner as described above. Thus, it is possible to secure an appropriate amount of timeslot with respect to communication links of data requiring QoS. In addition, by dynamically modifying the time width of a timeslot according to the actual data communication rate, it is possible to secure an optimum timeslot at the minimum for every period according to the data transmission condition, and it is possible to efficiently utilize the timeslot over the entire network. In particular, when data is individually transmitted by unicast communication by performing the multicast-to-unicast conversion, it is possible to efficiently transmit the data according to the type of data and the actual transmission condition by applying the transmission rate control according to the present embodiment.

Figure 11:
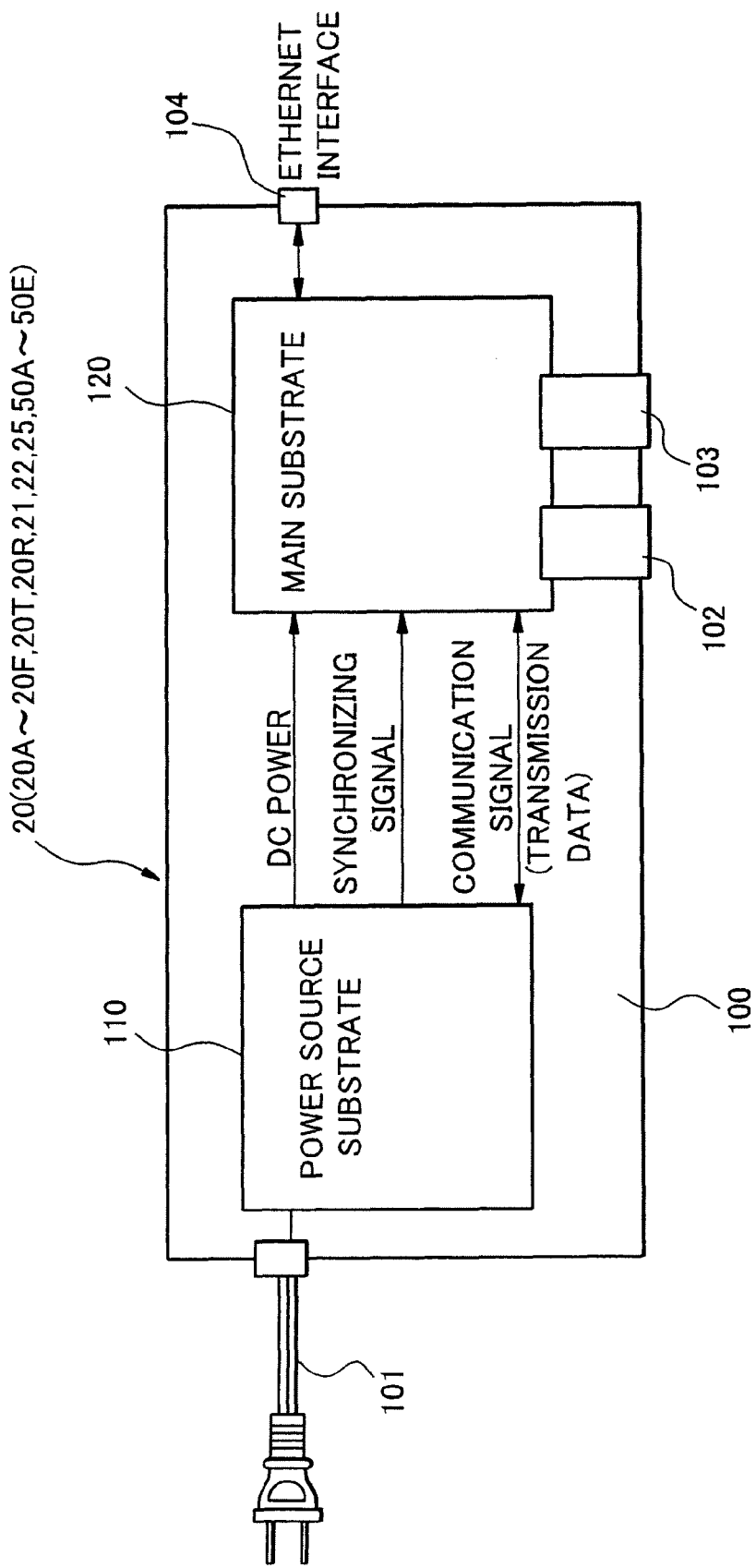
FIG. 11 is a block diagram schematically illustrating the configuration of a PLC adapter including the function of a transmission rate controller according to an embodiment of the present invention.
Figure 12:
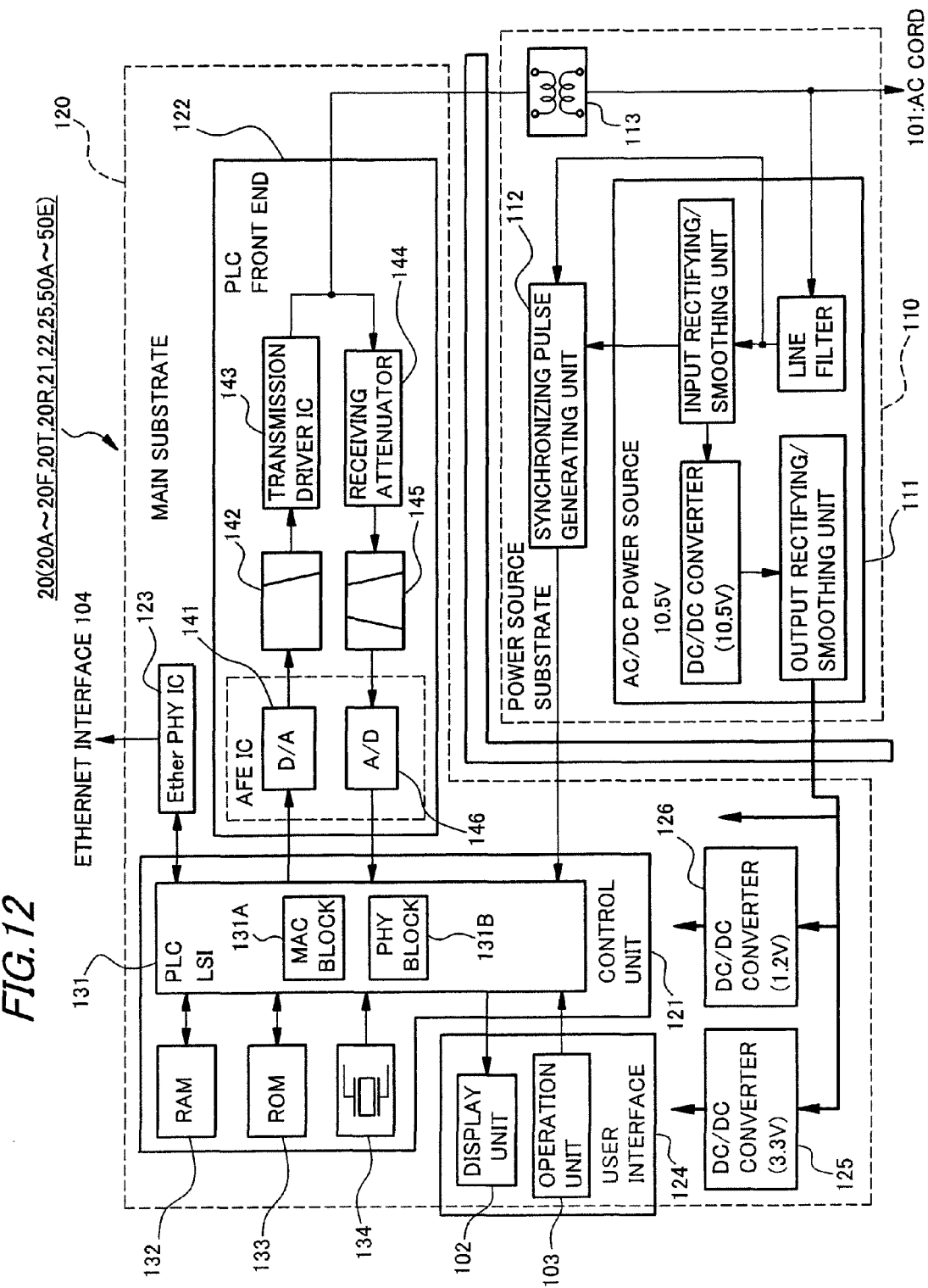
FIG. 12 is a block diagram illustrating the detailed configuration of the PLC adapter shown in FIG. 11.

FIGS. 11 and 12 illustrate the configuration of the PLC adapter 20 serving as the QoS controller that is a transmission rate controller. The PLC adapter 20 includes an adapter main body 100, an AC cord 101, a display unit 102 such as a liquid crystal display, an operation unit 103 such as a switch, and an Ethernet interface 104.

The AC cord 101 is connected through an indoor AC outlet to a power line to supply commercial electric power (e.g., AC 100 V) and to make a connection with a transmission path. The display unit 102 is composed of, for example, light-emitting diodes (LEDs) or a liquid crystal display (LCD), and is used to display the operational state of the PLC adapter 20. The operation unit 103 is composed of input operation switches, and is used to switch the operational mode of the PLC adapter 20, for example. The Ethernet interface 104 is connected to various electric apparatuses, such as an HDD recorder, a STB, a television set, an IP telephone, an IP camera, and a personal computer, and is used to transmit data between the apparatuses.

The adapter main body 100 is equipped with a power source substrate 110 and a main substrate 120. The power source substrate 110 is supplied with commercial electric power through the AC cord 101 to generate direct current (DC) power, and outputs the DC power to, for example, the main substrate 120. The power source substrate 110 and the main substrate 120 are electrically connected to each other to supply DC power and transmit various signals. The main substrate 120 is connected to the display unit 102, the operation unit 103, and the Ethernet interface 104.

FIG. 12 illustrates the internal structure of the power source substrate 110 and the main substrate 120. The power source substrate 110 includes an AC/DC power source 111, a synchronizing pulse generation unit 112, and an AC coupler 113.

The AC/DC power source 111 generates DC power (for example, DC 10.5 V) required for a circuit operation on the basis of an AC commercial electric power of 100 V supplied through the AC cord 101. The AC/DC power source 111 includes circuits for stabilizing a power supply voltage, such as a line filter, an input rectifying/smoothing unit, a DC/DC converting unit, and an output rectifying/smoothing unit. The synchronizing pulse generating unit 112 outputs, as a synchronizing pulse, a signal indicating timing synchronized with the AC waveform of a power source. In more detail, the synchronizing pulse generating unit 112 periodically outputs pulses at the timing when an AC voltage is zero. The AC coupler 113 is composed of, for example, a coupling transformer, and is provided between the AC cord 101 and the main substrate 120. The AC coupler 113 blocks DC power or AC power having a relatively low frequency and passes only communication signals.

The main substrate 120 includes a controller 121, a PLC front end 122, an Ethernet physical layer controller (Ether PHY IC) 123, a user interface 124 including a display unit and an operation unit, and DC/DC converting units 125 and 126.

The controller 121 includes a PLC integrated circuit (PLC LSI) 131, a RAM (SDRAM) 132, a ROM (F-ROM) 133, and a clock signal generating unit (TCXO: temperature compensated xtal oscillator) 134. The PLC LSI 131 includes a digital processing circuit using a microprocessor as a main element, MAC (communication media access control layer) block 131A, and a PHY (physical layer) block 131B. The RAM 132 is a read/write memory, and the ROM 133 is a read-only memory. Both of them perform data exchange with the PLC LSI 131. The ROM 133 stores programs or data that the PLC LSI 131 requires. The PLC LSI 131 sequentially executes programs in synchronization with clock signals generated by the clock signal generating unit 134, and serves as a modem required for PLC to perform various processes for data transmission through the power line communication (PLC).

The PLC front end 122 is provided between the controller 121 and the AC coupler 113, and includes a D/A converter 141, a transmission filter 142, a transmission driver IC 143, a receiving attenuator 144, a receiving filter 145, and an A/D converter 146. The D/A converter 141 and the A/D converter 146 constitute an AFE IC (analog front end IC) represented by a dotted line.

In the above-mentioned structure, the PLC LSI 131 receives data packets through the Ethernet interface and the Ethernet physical layer controller 123 from an electric apparatus connected to the PLC adapter 20, modulates the data packets, and generates multicarrier signals through PLC by OFDM as digital transmission signals. The multicarrier signal of PLC outputted as a transmission signal from the PLC LSI 131 is converted into a digital signal by the D/A converter 141 in the PLC front end 122, is filtered by the transmission filter 142, and is amplified by the transmission driver IC 143. The multicarrier signal of PLC passes through the AC coupler 113 in the power source substrate 110 and is transmitted to the power line 11, which is a transmission path.

The signal transmitted to the power line 11 as a multicarrier signal of PLC from another PLC adapter 20 passes through the AC cord 101 of the PLC adapter 20, passes through the AC coupler 113 in the power source substrate 110, and is input to the PLC front end 122 as an analog reception signal. The amplitude of the multicarrier signal of PLC inputted to the PLC front end 122 is adjusted by the receiving attenuator 144, and the multicarrier signal is filtered by the receiving filter 145, is converted into a digital signal by the A/D converter 146, and is input to the PLC LSI 131 as a digital reception signal.

The PLC LSI 131 demodulates the received multicarrier signal of PLC to acquire receiving data. The acquired receiving data is output from the PLC LSI 131 through the Ethernet physical layer controller 123 and the Ethernet interface to an electric apparatus connected to the PLC adapter 20.

The PLC LSI 131 has a communication control function in the PLC adapter serving as a main body. That is, the PLC LSI 131 has the above-mentioned functions of the QoS controller, i.e., a function of managing information of terminals connected to the PLC network, a function of allocating the time width of a timeslot to each communication link and dynamically adjusting the time width of the timeslot according to the data transmission rate, a function of scheduling a timeslot corresponding to the time width of the allocated timeslot, and a function of transmitting a beacon signal containing the schedule information. In addition, the PLC LSI 131 performs various processes related to the functions. In the PLC adapter serving as a slave, the PLC LSI 131 has a function of controlling its communication timing on the basis of the schedule set by the master. That is, the PLC LSI 131 has a function of detecting a beacon signal among the received signals and determining the timing of a timeslot used in its communication on the basis of the schedule information contained in the beacon signal.

As described above, in the present embodiment, when data requiring QoS is transmitted, i.e., when stream data is continuously reproduced on a PLC network, a QoS controller allocates and modifies the time width of a timeslot to a communication link between terminals transmitting data. At this time, it is possible to secure a minimum timeslot most suitable for an actual transmission environment by allocating the time width of the timeslot according to the type of data transmitted to each communication link and by modifying the time width of the timeslot according to the actual data transmission rate. Accordingly, since it is possible to appropriately allocate a limited timeslot, it is possible to allocate an unused part of the timeslot for data transmission of another terminal. As a result, it is possible to efficiently utilize the timeslot on the entire network.

In addition, in the above-mentioned embodiment, an apparatus for efficiently utilizing a timeslot by modifying the time width of the timeslot has been described. However, when a transmission path has a sufficient capacity, for example, one or more timeslots may be further allocated to streaming data to which one timeslot with a predetermined time width is allocated between beacons.

In addition, when a transmission path does not have a sufficient capacity, for example, the number of timeslots allocated to streaming data to which two or more timeslots with a predetermined time width are allocated between beacons may be reduced. Thus, it is possible to efficiently utilize the timeslot on the entire network by modifying the number of timeslots without changing the time width of the timeslot.

Further, it is possible to efficiently utilize the timeslot on the entire network by modifying the time width of timeslot and the number of timeslots.

In the above-mentioned embodiment, although the PLC adapter is separated from an electronic apparatus, the PLC adapter may be integrated into an electric apparatus. That is, an electric apparatus, such as a telephone, a facsimile, a television set, or a personal computer, may be equipped with the PLC adapter.

This application is based upon and claims the benefit of priority of Japanese Patent Application No. 2005-259295 filed on Sep. 7, 2005, the contents of which are incorporated herein by reference in its entirety.

INDUSTRIAL APPLICABILITY

According to the present invention, when data requiring QoS, such as stream data, is transmitted, it is possible to secure an appropriate timeslot according to the actual data transmission rate, and to efficiently utilize the timeslot on a limited transmission path. Further, the present invention can provide a transmission rate controller and an integrated circuit which are used in PLC transmitting stream data such as moving pictures or voices.

The invention claimed is:

1. A transmission rate controlling apparatus that controls a transmission rate of data transmitted from a first communication unit which communicates with a second communication unit through a power line, comprising:
   a reception unit that receives a request signal including information corresponding to a transmission rate which is demanded from the second communication unit;
   a timeslot allocation unit that allocates a first timeslot on the basis of the request signal;
   an information acquisition unit that acquires transmission rate information indicating the transmission rate of data transmitted from the first communication unit to the second communication unit in the first timeslot allocated by the timeslot allocation unit;
   a timeslot modification unit that modifies the first timeslot allocated by the timeslot allocation unit on the basis of the transmission rate information acquired by the information acquisition unit, wherein the data is transmitted in the modified first timeslot;
   a packet convert unit that converts a multicast packet into a unicast packet,
   wherein the timeslot allocation unit further allocates a second timeslot, different from the first timeslot and the modified first timeslot, for transmitting the unicast packet; and
   a transmission unit that transmits the unicast packet to the first communication unit and the second communication unit via the power line.

2. The transmission rate controlling apparatus according to claim 1, wherein
   the data is transmitted between the transmission rate controlling apparatus and a terminal connected through the power line, and
   the information acquisition unit acquires the transmission rate information from the terminal for receiving the data.

3. The transmission rate controlling apparatus according to claim 1, wherein the timeslot modification unit modifies the time width of the first timeslot.

4. The transmission rate controlling apparatus according to claim 3, wherein the timeslot modification unit modifies the time width of the first timeslot into a value, the value corresponding to a transmission rate obtained by adding a predetermined value to the transmission rate indicated by the transmission rate information acquired by the information acquisition unit.

5. The transmission rate controlling apparatus according to claim 3, wherein the timeslot modification unit modifies the time width of the first timeslot on the basis of the transmission rate for every predetermined period.

6. The transmission rate controlling apparatus according to claim 5, wherein the timeslot modification unit modifies the time width of the first timeslot on the basis of at least one of an average value, a minimum value, and a maximum value of the transmission rate.

7. The transmission rate controlling apparatus according to claim 3, wherein the timeslot modification unit modifies the time width of the first timeslot on the basis of an instantaneous value of the transmission rate.

8. The transmission rate controlling apparatus according to claim 1, wherein the timeslot modification unit deletes the first timeslot allocated by the timeslot allocation unit when the transmission rate is zero.

9. The transmission rate controlling apparatus according to claim 1, wherein the transmission unit individually transmits the unicast packet to the first communication unit and the second communication unit via the power line.

10. The transmission rate controlling apparatus according to claim 1, wherein the data is stream data.

11. The transmission rate controlling apparatus according to claim 1, wherein the timeslot allocation unit allocates the first timeslot used in a time division multiplex access mode.

12. A method of controlling a transmission rate, comprising:
    controlling the transmission rate of data transmitted from a first communication unit which communicates with a second communication unit through a power line;
    receiving a request signal including information corresponding to a transmission rate which is demanded from the second communication unit;
    allocating a first timeslot for transmitting the data on the basis of the request signal;
    acquiring transmission rate information indicating the transmission rate of data transmitted from the first communication unit to the second communication unit in the first timeslot;
    modifying the first timeslot on the basis of the transmission rate information and transmitting the data in the modified first timeslot;
    converting a multicast packet into a unicast packet,
    allocating a second timeslot, different from the first timeslot and the modified first timeslot, for transmitting the unicast packet; and
    transmitting the unicast packet to the first communication unit and the second communication unit via the power line.

13. The method of controlling a transmission rate according to claim 12, wherein
    the data is transmitted between an apparatus for controlling the transmission rate by the transmission rate controlling method and a terminal connected through the power line, and
    the transmission rate information is acquired from a terminal for receiving the data.

14. The method of controlling a transmission rate according to claim 12, wherein the modifying of the first timeslot comprises modifying the time width of the first timeslot.

15. The method of controlling a transmission rate according to claim 14, wherein the time width of the first timeslot is modified into a value, the value corresponding to the transmission rate setup value obtained by adding a predetermined value to a transmission rate indicated by the transmission rate information.

16. The method of controlling a transmission rate according to claim 14, wherein the time width of the first timeslot is modified on the basis of the transmission rate for every predetermined period.

17. The method of controlling a transmission rate according to claim 16, wherein the time width of the first timeslot is modified on the basis of at least one of an average value, a minimum value, and a maximum value of the transmission rate.

18. The method of controlling a transmission rate according to claim 12, wherein the allocated first timeslot is deleted when the transmission rate is zero.

19. The method of controlling a transmission rate according to claim 12, wherein the transmitting of the unicast packet comprises individually transmitting the unicast packet to the first communication unit and the second communication unit via the power line.

20. The method of controlling a transmission rate according to claim 12, wherein the data is stream data.

21. An integrated circuit that controls a transmission rate of data transmitted from a first communication unit which communicates with a second communication unit through a power line, comprising:

a reception unit that receives a request signal including information corresponding to a transmission rate which is demanded from the second communication unit;

a timeslot allocation unit that allocates a first timeslot on the basis of the request signal;

an information acquisition unit that acquires transmission rate information indicating the transmission rate of data transmitted from the first communication unit to the second communication unit in the first timeslot allocated by the timeslot allocation unit;

a timeslot modification unit that modifies the first timeslot allocated by the timeslot allocation unit on the basis of the transmission rate information acquired by the transmission rate information acquisition unit, wherein the data is transmitted in the modified first timeslot;

a packet convert unit that converts a multicast packet into a unicast packet, wherein the timeslot allocation unit further allocates a second timeslot, different from the first timeslot and the modified first timeslot, for transmitting the unicast packet; and a transmission unit that transmits the unicast packet to the first communication unit and the second communication unit via the power line.

\* \* \* \* \*